United States Patent
Muraki et al.

(10) Patent No.: US 7,522,488 B2
(45) Date of Patent: Apr. 21, 2009

(54) METHOD AND APPARATUS FOR REPRODUCING CONTENT ACCORDING TO INFORMATION EMBEDDED IN THE CONTENT

(75) Inventors: Kenji Muraki, Osaka (JP); Masataka Nikaido, Osaka (JP)

(73) Assignee: Panasonic Corporation, Osaka (JP)

( * ) Notice: Subject to any disclaimer, the term of this patent is extended or adjusted under 35 U.S.C. 154(b) by 313 days.

(21) Appl. No.: 10/593,194

(22) PCT Filed: May 24, 2005

(86) PCT No.: PCT/JP2005/009433

§ 371 (c)(1),
(2), (4) Date: Sep. 15, 2006

(87) PCT Pub. No.: WO2005/117012

PCT Pub. Date: Dec. 8, 2005

(65) Prior Publication Data

US 2007/0140078 A1    Jun. 21, 2007

(30) Foreign Application Priority Data

May 27, 2004    (JP)    ............................. 2004-157968

(51) Int. Cl.
G11B 15/52    (2006.01)
(52) U.S. Cl. ................................ 369/47.12; 369/53.21
(58) Field of Classification Search ........................ None
See application file for complete search history.

(56) References Cited

U.S. PATENT DOCUMENTS

| | | | | |
|---|---|---|---|---|
| 6,707,774 B1 * | 3/2004 | Kuroda et al. | ............ | 369/53.21 |
| 7,092,910 B2 * | 8/2006 | Iwamura | ...................... | 705/55 |
| 2002/0118565 A1 | 8/2002 | Matsuo | | |
| 2007/0147207 A1 * | 6/2007 | Sako et al. | ................ | 369/53.31 |

FOREIGN PATENT DOCUMENTS

| | | |
|---|---|---|
| EP | 1241882 A2 | 9/2002 |
| EP | 1459315 A2 | 9/2004 |
| JP | 09-106613 A | 4/1997 |
| JP | 2000-200465 A | 7/2000 |
| JP | 2001-069336 A | 3/2001 |
| JP | 2001-229612 A | 8/2001 |
| JP | 2002-197669 A | 7/2002 |
| JP | 2002-268949 A | 9/2002 |
| JP | 2002-297034 A | 10/2002 |
| JP | 2003-228523 A | 8/2003 |

* cited by examiner

*Primary Examiner*—Paul Huber
(74) *Attorney, Agent, or Firm*—Harness, Dickey & Pierce, PLC

(57) ABSTRACT

In an apparatus that carries out reproduction control on the basis of digital watermark information embedded in a content, for the purpose of providing a reproducing apparatus and a reproducing method in which reproduction stoppage in the middle of reproduction according to the detection result of the digital watermark information does not occur, the reproducing apparatus and the reproducing method are configured so that before reproduction the detection section thereof detects attached information embedded in a content that is recorded on a recording medium, so that the content and the attached information that is detected using the detection section are stored in the storage section thereof so as to be related to each other, and so that the reproduction of the content corresponding to the attached information stored in the storage section is controlled according to the attached information.

12 Claims, 12 Drawing Sheets

*Fig.9*

| DIGITAL CCI | DETAILS OF REPRODUCTION CONTROL | WATERMARK CCI | DETAILS OF REPRODUCTION CONTROL |
|---|---|---|---|
| COPY-FREE | LIMITED REPRODUCTION | COPY-FREE | ORDINARY REPRODUCTION |
| COPY-LIMITED | ORDINARY REPRODUCTION | COPY-LIMITED | LIMITED REPRODUCTION |
| COPY-PROHIBITED | ORDINARY REPRODUCTION | COPY-PROHIBITED | LIMITED REPRODUCTION |

# METHOD AND APPARATUS FOR REPRODUCING CONTENT ACCORDING TO INFORMATION EMBEDDED IN THE CONTENT

This application is a 371 of PCT/JP05/09433, filed May 24, 2005.

TECHNICAL FIELD

The present invention relates to a reproducing apparatus and a reproducing method for controlling the reproduction of the contents of a recording medium, on which digital audio data, digital video data, etc. are recorded, according to attached information embedded in the contents.

BACKGROUND ART

In recent years, as the digitalization of audio-visual apparatuses has progressed, copying is made possible without causing any deterioration in the quality of contents. However, copying copyrighted contents without limitation will result in infringing the rights of copyright holders. Audio-visual apparatuses are also requested to have an appropriate copyright protection function. Not only recording apparatuses but also reproducing apparatuses are requested to have a function that prohibits the reproduction of illegal contents.

As a copy control system for digital audio apparatuses, the serial copy management system (hereafter simply referred to as SCMS) has been used widely since 1980s. In the SCMS, copy control information is recorded, together with contents, on recording media, such as CDs and MDs, and media, such as airwaves, and copying possible/impossible control is carried out according to the copy control information of contents when the contents are copied inside the same housing of an apparatus or between different apparatuses connected via a digital interface. The SCMS has achieved a considerable effect on consumer-oriented recording apparatuses, such as MD players.

However, in the SCMS, copy control information is digital data independent of contents. Hence, when the contents are analog-transmitted according to the SCMS, the copy control information cannot be transmitted, and copy control cannot be carried out either. Furthermore, in the SCMS, there is a problem that the copy control information can be disabled easily using a personal computer or the like.

In consideration of this kind of problem encountered in the SCMS, the music industry, computer industry, consumer-oriented electronics industry, etc. gathered and established the SDMI (Secure Digital Music Initiative) standard. In this standard, a copy-control/reproduction-control system that uses digital watermarking technology is proposed.

A digital watermark is information embedded in a multimedia content, such as a still image, a moving image or audio data, so as not to be perceivable by human beings using the characteristics of the sensory perception of human beings, and is information different from the content itself. In other words, information different from the content is embedded in the content itself by adding a minor change unperceivable by human beings to the content. Digital watermarking is carried out using various methods, such as the echo control method, spectrum spread method, statistic operation method, phase operation method and static control method.

Even when a signal embedded with a digital watermark is reproduced, the difference from the original signal cannot be perceived by ordinary watching and listening, and the quality of the content is not impaired. Because the digital watermark is directly embedded in the content, copy control information can be transmitted even when analog transmission is used. In addition, the digital watermark has durability because the copy control information is retained even after the information is subjected to ordinary audio compression/decompression (MP3 or the like). Furthermore, the digital watermark cannot be read or written without using special embedding and deciphering apparatuses. Hence, copy control more powerful than the SCMS can be achieved by combining the digital watermark with the encipherment of the content itself.

As conventional reproduction control that uses digital watermarking, the reproduction control of the reproducing apparatus disclosed in Japanese Patent Application Laid-Open No. 2001-229612 is known. This publication describes a digital data copying control method and an optical disk reproducing method.

In the following description of the conventional reproduction control, the copy control information embedded in a content using digital watermarking is referred to as watermark CCI. On the other hand, the copy control information recorded on an optical disk as digital data independent of the content is referred to as digital CCI. In the reproduction from an optical disk, the digital CCI and the watermark CCI are requested to be subjected to reproduction control shown in FIG. 9. FIG. 9 is a table showing the details of the reproduction control for the attached information, that is, the digital CCI and the watermark CCI.

FIG. 10 is a block diagram of a conventional optical disk reproducing apparatus that uses the conventional copy control method. The conventional optical disk reproducing apparatus 174 shown in FIG. 10 is provided with a spindle motor 161 that rotates a disk 160, an optical pickup 162 that reads signals recorded on the disk 160, and a mechanism control section 163 that drives and controls the spindle motor 161 and the optical pickup 162. In the conventional optical disk reproducing apparatus, a signal processing section 164 takes data from the output of the optical pickup 162 and carries out error correction to extract a system stream, and outputs a control signal to the mechanism control section 163. A deciphering device 165 checks whether the system stream is enciphered or not, and deciphers the system stream if it is enciphered. A digital CCI decoding device 166 detects digital CCI from the unenciphered system stream that is output from the deciphering device 165. An AV decoding device 167 extracts a digital audio signal or a digital video signal from the unenciphered system stream that is output from the deciphering device 165, and decodes the signal. A watermark CCI decoding device 169 detects watermark CCI data from the digital audio signal or the digital video signal that is output from the AV decoding device 167. A D/A converter 168 converts the digital audio signal or the digital video signal into an analog audio signal or an analog video signal. A digital signal output control section 170 converts the digital audio signal or the digital video signal into a specified output format (for example, IEC60958 or IEEE1394), and controls the output of the converted signal. An analog signal output control section 171 controls the output of the analog audio signal or the analog video signal that is output from the D/A converter 168. A display section 172 displays the state of operation. A system control section 173 reads the watermark CCI data and the digital CCI data, and controls the digital signal output control section 170 and the analog signal output control section 171, and also controls the display section 172 and the mechanism control section 163.

The digital reproducing operation of the conventional optical disk reproducing apparatus 174 configured as described above will be described below.

In the digital reproducing operation, first, the signal recorded on the disk 160 is read using the optical pickup 162. While outputting a control signal to the mechanism control section 163, the signal processing section 164 takes data and carries out error correction to extract a system stream. The deciphering device 165 checks whether the system stream is enciphered or not, and deciphers the system stream if it is enciphered. The deciphering device 165 transfers the deciphered system stream and the unenciphered system stream to the digital CCI decoding device 166 and the AV decoding device 167. The AV decoding device 167 extracts a digital audio signal or a digital video signal from the system stream, decodes the extracted signal, and transfers the signal to the watermark CCI decoding device 169 and the digital signal output control section 170. The digital signal output control section 170 converts the digital audio signal or the digital video signal into a specified output format (for example, IEC60958 or IEEE1394), and outputs the converted signal. The digital CCI decoding device 166 decodes digital CCI data from the system stream, and transfers the data to the system control section 173. The watermark CCI decoding device 169 decodes watermark CCI data from the digital audio signal or the digital video signal, and transfers the data to the system control section 173. The system control section 173 reads the digital CCI data and the watermark CCI data, and controls the digital signal output control section 170 and the mechanism control section 163 according to the data. In addition, the system control section 173 transfers operation display information to the display section 172.

An example of a copy control flow during reproduction in the conventional optical disk reproducing apparatus configured as described above will be described below using FIG. 11.

First, a check is carried out as to whether the system stream output from the deciphering device 165 is enciphered or not (at step 1001). In the case that the system stream is enciphered, a check is carried out as to whether digital CCI data is present or not (at step 1002). In the case that digital CCI data is present, a check is carried out as to whether the digital CCI data is "copy-free" or not (at step 1003). As shown in FIG. 9, reproduction is permitted only when the digital CCI of the enciphered digital audio data or, digital video data is "copy-limited" or "copy-prohibited," and reproduction is not permitted when the digital CCI is "copy-free." Hence, in the case that the digital CCI data is "copy-free," the disk is judged as a disk copied illegally. As a result, both the digital signal output control section 170 and the analog signal output control section 171 are controlled, and both the digital signal output and the analog signal output are muted (at step 1004). On the other hand, in the case that it is judged that the digital CCI data is not "copy-free" at step 1003, ordinary reproduction is carried out (at step 1008).

Furthermore, in the case that it is judged at step 1001 that the system stream is not enciphered and in the case that it is judged at step 1002 that there is no digital CCI data even if the system stream is enciphered, a check is carried out as to whether the watermark CCI obtained in the watermark CCI decoding device 169 is present or not (at step 1009). Next, in the case that watermark CCI data is present, a check is carried out as to whether the watermark CCI data is "copy-free" or not (at step 1010). As shown in FIG. 9, ordinary reproduction is made possible only when the watermark CCI data is "copy-free" (at step 1012). In other cases, that is, in the case that the watermark CCI data is "copy-limited" and in the case that the watermark CCI data is "copy-prohibited," the disk is judged as a disk copied illegally. As a result, both the digital signal output control section 170 and the analog signal output control section 171 are controlled, and both the digital signal output and the analog signal output are muted (at step 1011).

A judgment is made as to whether the end of a reproduction unit (a piece of music or the like) is reached (at step 1005). If the end is not reached, the procedure returns to step 1001. If the end is reached, a judgment is made as to whether the end of the reproduction of the whole disk is reached or not (at step 1006). In the case that the end of the reproduction of the whole disk is not reached, the digital signal output control section 170 and the analog signal output control section 171 are reset to their ordinary output states (at step 1007), and the procedure returns to step 1001. On the other hand, when the end of the reproduction of the whole disk is reached, the reproduction is completed.

Patent document 1: Japanese Patent Application Laid-Open No. 2001-229612

DISCLOSURE OF THE INVENTION

Problem to be Solved by the Invention

However, because the conventional optical disk reproducing apparatus described above is configured to detect watermark CCI data while carrying out reproduction, in the case that the watermark CCI data is detected in the middle of reproduction, the operation of the apparatus may stop in the middle of reproduction, thereby having a problem of causing inconvenience.

The SDMI digital watermark technology being used for DVD audio reproducing apparatuses and semiconductor audio reproducing apparatuses (memory stick audio reproducing apparatuses, SD audio reproducing apparatuses, etc.) will be described below.

In the digital watermark technology, 12-bit information can be embedded as watermark CCI in digital audio data represented by the linear PCM format. Among the 12 bits, 2 bits are used for copy control information (CCI), and the three states, "copy-free," "copy-limited" and "copy-prohibited," are represented by the copy control, information (CCI). Although four states can be represented using 2 bits, the remaining one is prohibited to be used.

Because the above-mentioned digital CCI data is recorded, for example, in the TOC area of a disk or at a predetermined position of the header of a bit stream in a directly readable format, the data can be read easily and quickly. On the other hand, a digital watermark is detected by subjecting digital audio data having a predetermined time length (15 seconds in the case of the SDMI system) and represented by the linear PCM format to predetermined signal processing. The method of the signal processing is not disclosed to ensure the reliability of the digital watermark.

In the case that a content is compressed in the MP3 format or the like, after the content is decoded into the linear PCM format, digital watermark detection is performed by carrying out predetermined signal processing. Even in the case of an analog signal, after it is converted into the linear PCM format using an A/D converter, digital watermark detection is performed by carrying out predetermined signal processing.

The result of the digital watermark detection is whether a digital watermark is detected or not. In the case that a digital watermark is detected, one of the three states, "copy-free," "copy-limited" and "copy-prohibited," is identified.

The digital watermark is requested so as not to be erased even after it is subjected to digital compression and analog recording/reproduction. However, as the digital audio signal is deteriorated, the accuracy of digital watermark detection lowers, and the detection may become erroneous or impossible. Because the detection may become erroneous or impossible, the method of using the result of the detection has been specified.

In the case that the "copy-prohibited" state is detected, recording and reproduction cannot be carried out occasionally depending on the specifications of each apparatus category. For the prevention of disadvantage to the user, it is specified that the probability of erroneously detecting that the state is "copy-prohibited" even if a digital watermark representing the "copy-prohibited" state is not embedded is less than $10^{-12}$. Conversely, in the case that the "copy-prohibited" state is detected, the reliability of the detection is very high, and the processing according to the state is carried out immediately.

On the other hand, it is specified that the probability of not detecting a digital watermark although the digital watermark is embedded is less than 50%. Hence, in the case that no digital watermark can be detected when detection is performed once, if a judgment is immediately made that no digital watermark is embedded in the content, there is a high possibility that the judgment is wrong.

FIG. 12 is a schematic view showing an example of the timing of detecting a digital watermark from a content recorded on an optical disk. The length of data required for one digital watermark detection (this data is referred to as a detection window) is 15 seconds as described above. In the case of digital audio data having a length of more than 15 seconds, digital watermark detection can be performed once every 15 seconds. The range in which a first digital watermark detection can be performed is from the start position (0 seconds) to the position where 30 seconds has elapsed from the start position. Furthermore, the start of the digital watermark detection window is not required to be the start position of the content. Hence, in the latest case, it is possible that the detection window starts from a position where approximately 14 seconds has elapsed from the start of the content. In this case, the first digital watermark in the content is detected at the position where approximately 29 seconds has elapsed from the start of the content. In the case that no digital watermark is detected in the first detection window, digital watermark detection is attempted again at a desired position where 45 seconds or more has elapsed from the head of the same content. If no digital watermark is detected even when the detection is attempted, it is judged that no digital watermark is embedded in the content.

As described above, in the conventional digital watermark detection method, after 15 seconds or more has elapsed from the start of the reproduction of a content, there is a possibility that the reproduction of the content is stopped according to the result of the detection in the first detection window. Furthermore, after one minute or more has elapsed after the start of the reproduction, there is a possibility that the reproduction of the content is stopped according to the result of the detection in the second detection window. As described above, in the case that the conventional digital watermark detection is used, inconvenience, such as reproduction stoppage in the middle of reproduction, may occur occasionally. Hence, the conventional apparatus is inconvenient for the user.

For the purpose of solving the above-mentioned problem encountered in the conventional digital watermark detection method, the present invention is intended to provide a reproducing apparatus and a reproducing method being high in reliability, wherein reproduction stoppage in the middle of reproduction according to the result of digital watermark detection does not occur.

Means for Solving the Problem

For the purpose of achieving the above-mentioned object, a reproducing apparatus according to a first aspect of the present invention comprises:

a detection section that detects attached information embedded in a content recorded on a recording medium, and a control section that controls the reproduction of the content corresponding to the attached information detected using the detection section according to the attached information, wherein when a reproduction start command has been input, attached information detection operation for detecting the attached information is performed before reproducing operation, and reproduction control is carried out according to the result of the detection. In the reproducing apparatus according to the present invention, configured as described above, the attached information embedded in the content is detected before reproducing operation. Hence, reproduction stoppage in the middle of reproducing operation according to the detection result of the attached information does not occur in the reproducing apparatus.

The attached information according to the present invention is distributed over the whole area of a content portion having a predetermined length, integrated with the content and related to the reproduction control of the content.

A reproducing apparatus according to a second aspect of the present invention comprises:

a detection section that detects attached information embedded in a content recorded on a recording medium before reproducing operation is carried out, a storage section that stores the attached information detected using the detection section and the content so as to be related to each other using a method capable of preventing falsification or a method capable of detecting falsification, and a control section that controls the reproduction of the content corresponding to the attached information stored in the storage section according to the attached information. In the reproducing apparatus according to the present invention, configured as described above, the attached information embedded in the content is detected before reproducing operation. Hence, reproduction stoppage in the middle of reproducing operation according to the detection result of the attached information does not occur in the reproducing apparatus.

A reproducing apparatus according to a third aspect of the present invention comprises:

a detection section that detects attached information embedded in a content recorded on a recording medium when the attached information is in a detectable state, a storage section that stores the detected attached information and the content so as to be related to each other using a method capable of preventing falsification or a method capable of detecting falsification, and a control section that controls the reproduction of the content corresponding to the attached information stored in the storage section according to the attached information. In the reproducing apparatus according to the present invention, configured as described above, the attached information embedded in the content is detected when the attached information is in a detectable state, even if no reproduction start command is received. Hence, reproduction stoppage in the middle of reproducing operation according to the detection result of the attached information does not occur in the reproducing apparatus.

A reproducing apparatus according to a fourth aspect of the present invention is the reproducing apparatus according to the above-mentioned first to third aspects, wherein the detection result regarding the attached information detected using the detection section is recordable on the recording medium.

A reproducing apparatus according to a fifth aspect of the present invention is the reproducing apparatus according to the above-mentioned first to fourth aspects, wherein the detection section is formed of a digital watermark detection section.

A reproducing apparatus according to a sixth aspect of the present invention is the reproducing apparatus according to the above-mentioned first to fourth aspects, wherein the attached information is information embedded as a digital watermark in the content.

A reproducing apparatus according to a seventh aspect of the present invention is the reproducing apparatus according to the above-mentioned first to fourth aspects, wherein the detection of the attached information using the detection section is done more quickly than reproducing operation.

For the purpose of achieving the object of the present invention, a reproducing method according to an eighth aspect of the present invention comprises:

a step of detecting attached information embedded in a content recorded on a recording medium before reproducing operation is carried out when a reproduction start command has been input, and a step of controlling the reproduction of the content corresponding to the detected attached information according to the attached information. In the reproducing method according to the present invention, having the steps described above, the attached information embedded in the content is detected before reproducing operation. Hence, inconvenience, that is, reproduction stoppage in the middle of reproducing operation according to the detection result of the attached information, does not occur in the reproducing method.

A reproducing method according to a ninth aspect of the present invention comprises:

a step of detecting attached information embedded in a content recorded on a recording medium before reproducing operation is carried out, a step of storing the detected attached information and the content so as to be related to each other using a method capable of preventing falsification or a method capable of detecting falsification, and a step of controlling the reproduction of the content corresponding to the stored attached information according to the attached information. In the reproducing method according to the present invention, having the steps described above, the attached information embedded in the content is detected before reproducing operation. Hence, inconvenience, that is, reproduction stoppage in the middle of reproducing operation according to the detection result of the attached information, does not occur in the reproducing method.

A reproducing method according to a tenth aspect of the present invention comprises:

a step of detecting attached information embedded in a content when the attached information is in a detectable state, even before a reproduction start command is input, a step of storing the detected attached information, and a step of controlling the reproduction of the content corresponding to the stored attached information according to the attached information. In the reproducing method according to the present invention, having the steps described above, the attached information embedded in the content is detected when the attached information is in a detectable state, even if no reproduction start command is received. Hence, inconvenience, that is, reproduction stoppage in the middle of reproducing operation according to the detection result of the attached information, does not occur in the reproducing method.

A reproducing method according to an 11th aspect of the present invention is the reproducing method according to the above-mentioned eighth to tenth aspects, wherein the detection result regarding the attached information of the content recorded on the recording medium is recorded on the recording medium.

A reproducing method according to a 12th aspect of the present invention is the reproducing method according to the above-mentioned eighth to tenth aspects, wherein the detection of the attached information is done more quickly than reproducing operation.

Effect of the Invention

As described above, in the reproducing apparatus and the reproducing method according to the present invention, in the case that the user carries out reproduction start operation, before the reproduction of the content, the attached information embedded in the content is detected, and reproduction control is carried out according to the detected attached information. Hence, inconvenience, such as reproduction stoppage in the middle of reproduction, does not occur. In addition, the attached information is checked before reproduction without outputting sound to the outside of the reproducing apparatus. Hence, the checking of the attached information can be processed quickly, and the processing of portions of the content, not required to be processed, can be omitted. This produces an effect of raising the efficiency of the detection processing.

In addition, in the reproducing apparatus and the reproducing method according to the present invention, the attached information embedded in the content is detected, and the result of the detection is stored in the recording medium itself. In the case that the user has carried out reproduction start operation, if there is attached information having already been detected, reproduction control is performed according to the attached information. Hence, inconvenient operation, such as reproduction stoppage in the middle of reproduction, does not occur. Furthermore, in the case that the recording medium is inserted into the reproducing apparatus again, valid information items of the attached information stored the last time are used. Hence, it is not necessary to newly detect the attached information. This produces an effect of completing the detection processing more quickly.

Furthermore, in the reproducing apparatus and the reproducing method according to the present invention, if the detection section is in a state of being able to detect the attached information of the content, the detection section automatically detects the attached information embedded in the content even if the user does not carry out reproduction start operation. In the case that the user has carried out reproduction start operation, reproduction control is performed according to the attached information having already been detected. Hence, inconvenience, such as reproduction stoppage in the middle of reproduction, does not occur.

Moreover, the reproducing apparatus according to the present invention is configured to automatically detect the attached information embedded in the content and to store the result of the detection on the recording medium itself. In the reproducing apparatus configured as described above, in the case that the user has carried out reproduction start operation, reproduction control is performed according to the attached information having already been detected. Hence, inconvenient operation, such as reproduction stoppage in the middle of reproduction, does not occur. Furthermore, in the reproducing apparatus configured as described above, in the case that the recording medium is inserted into the reproducing apparatus again, valid information items of the attached information stored the last time are used. Hence, it is not necessary to newly detect the attached information, and the processing can be carried out quickly.

BRIEF DESCRIPTION OF THE DRAWINGS

FIG. 9 is a table showing the reproduction control states of an optical disk reproducing apparatus that uses the conventional copy control method;

Figure 1:
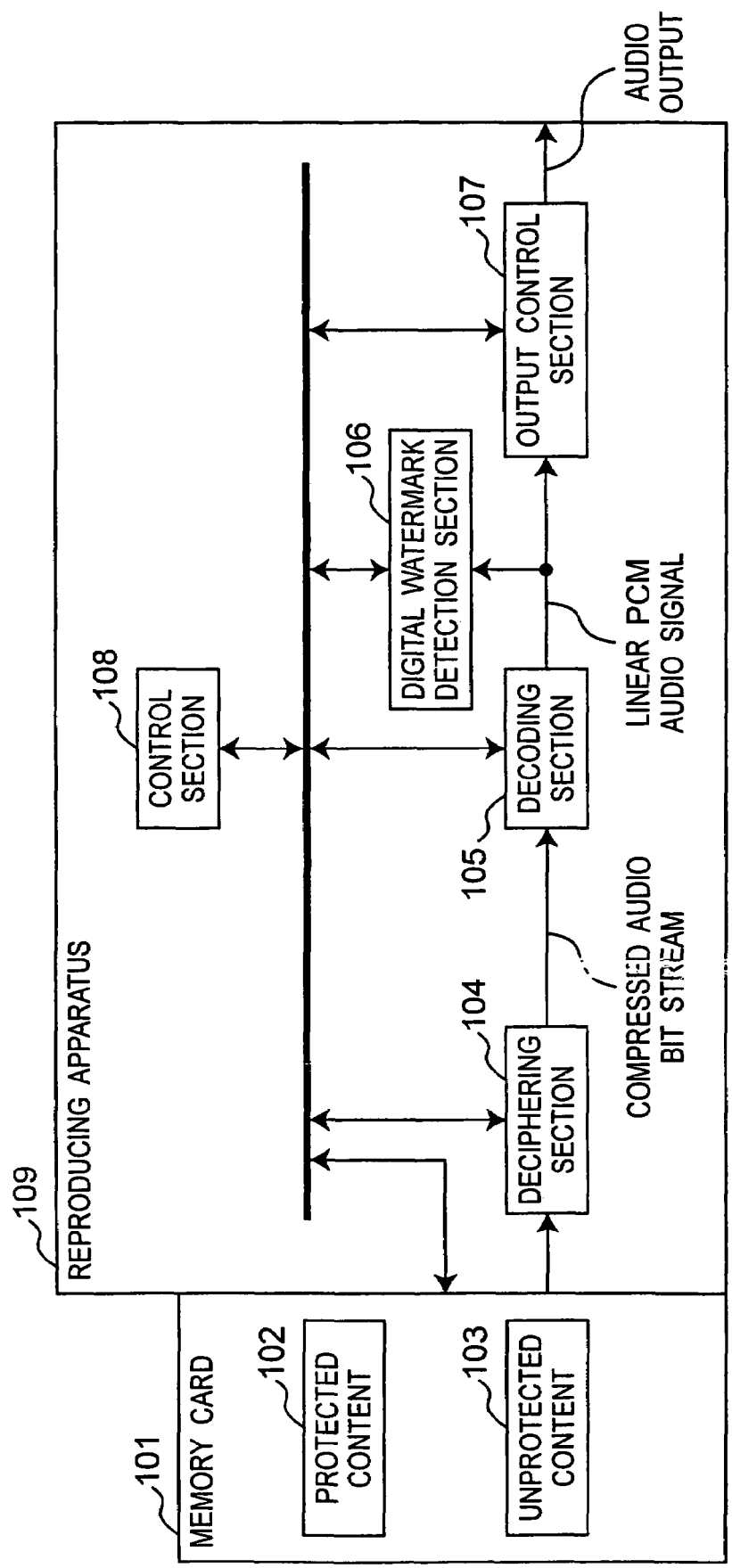
FIG. 1 is a block diagram showing the configuration of a reproducing apparatus 109 according to Embodiment 1 of the present invention.

EXPLANATIONS OF NUMERALS 101, 201 memory card
102 protected content
103 unprotected content
104 deciphering section
105 decoding section
106 digital watermark detection section
107 output control section
108 control section
109, 209, 309 reproducing apparatus
310, 610 storage section

BEST MODES FOR CARRYING OUT THE INVENTION

Preferable embodiments according to the present invention will be described below referring to the accompanying drawings. In the description of the above-mentioned background art, an optical disk was used as an example of a recording medium. In the descriptions of the following embodiments, however, a memory card is used as a recording medium.

Embodiment 1

FIG. 1 is a block diagram showing the configuration of a reproducing apparatus according to Embodiment 1 of the present invention.

In FIG. 1, a protected content 102 serving as enciphered compressed audio data and an unprotected content 103 serving as unenciphered compressed audio data are recorded on a memory card 101 serving as a medium for recording contents and the like. Multiple protected contents 102 and multiple unprotected contents 103 may also be present in the memory card 101. A deciphering section 104 checks whether a content obtained from the memory card 101 is enciphered or not, and deciphers the content if it is enciphered. A decoding section 105 decodes the unenciphered compressed audio stream that is output from the deciphering section 104. A digital watermark detection section 106 detects a digital watermark from a linear PCM audio signal that is output from the decoding section 105. An output control section 107 controls the output of the linear PCM signal. A control section 108 controls the memory card 101, the deciphering section 104, the decoding section 105, the digital watermark detection section 106 and the output control section 107. The reproducing apparatus 109 according to Embodiment 1 comprises the deciphering section 104, the decoding section 105, the digital watermark detection section 106, the output control section 107 and the control section 108. In the reproducing apparatus according to Embodiment 1, its detection section is formed of the digital watermark detection section 106.

In Embodiment 1, the memory card 101 and the reproducing apparatus 109 are further equipped with an authentication function (not shown). The protected content 102 in the memory card 101 is enciphered using a special-purpose apparatus (a special-purpose recording apparatus, tamper-resistant application software on a personal computer or the like) and then recorded. No ordinary user can falsify the protected content 102. Hence, the protected content 102 deciphered using the deciphering section 104 in the reproducing apparatus 109, and the attached information of the content (for example, copy control information) are sufficiently reliable. In the reproduction of the protected content 102, the deciphered attached copy control information should only be used directly. It is not necessary to perform digital watermark checking.

On the other hand, the unprotected content 103 is created using a general-purpose personal computer or the like, and recorded on the memory card 101 without being enciphered. An MP3 file encoded using free encoding software is known as an example of the unprotected content 103. Therefore, the unprotected content 103 has no attached copy control information or the like. However, in the case that copy control information is embedded in the content itself using digital watermarking, reproduction control corresponding to this copy control information should be carried out for copyright protection. According to the SDMI standard, in a reproducing apparatus conforming to the standard, a content in which a digital watermark indicating the "copy-prohibited" state is detected during reproduction is regarded as being obtained by illegally copying copy-prohibited data to the memory card 101, and the reproduction of the content is prohibited.

The operation of the reproducing apparatus 109 according to Embodiment 1 of the present invention, configured as described above, will be described below.

In the state that the memory card 101 is inserted in the reproducing apparatus 109, when the user operates to reproduce the unprotected content 103, a reproduction start command is issued, and a compressed audio bit stream obtained from the unprotected content 103 is decoded using the decoding section 105. Then, a digital watermark is detected from the linear PCM audio signal that is output from the decoding section 105. The decoding processing and the digital watermark detection processing will be described later. At this time, the decoded linear PCM audio signal is muted using the output control section 107 so as not to be output to the outside of the reproducing apparatus 109.

After the digital watermark checking for the unprotected content 103 to be reproduced is completed, reproduction control is carried out according to the result of the checking. In other words, in the case that the "copy-prohibited" state is written as copy control information, the state is displayed, and no reproduction is carried out. On the other hand, in the case of the "copy-free" state or the "copy-limited" state, or in the case that no digital watermark is detected, the unprotected content 103 is decoded at ordinary speed, and the linear PCM audio signal is output. At this time, the muting processing of the output control section 107 is cancelled. Because the digital watermark detection has already been completed, the reproduction does not stop in the middle. In the above-mentioned series of operation, the respective sections carry out the above-mentioned operations under the control of the control section 108.

The decoding processing and the digital watermark detection processing will be described further additionally.

Figure 12:
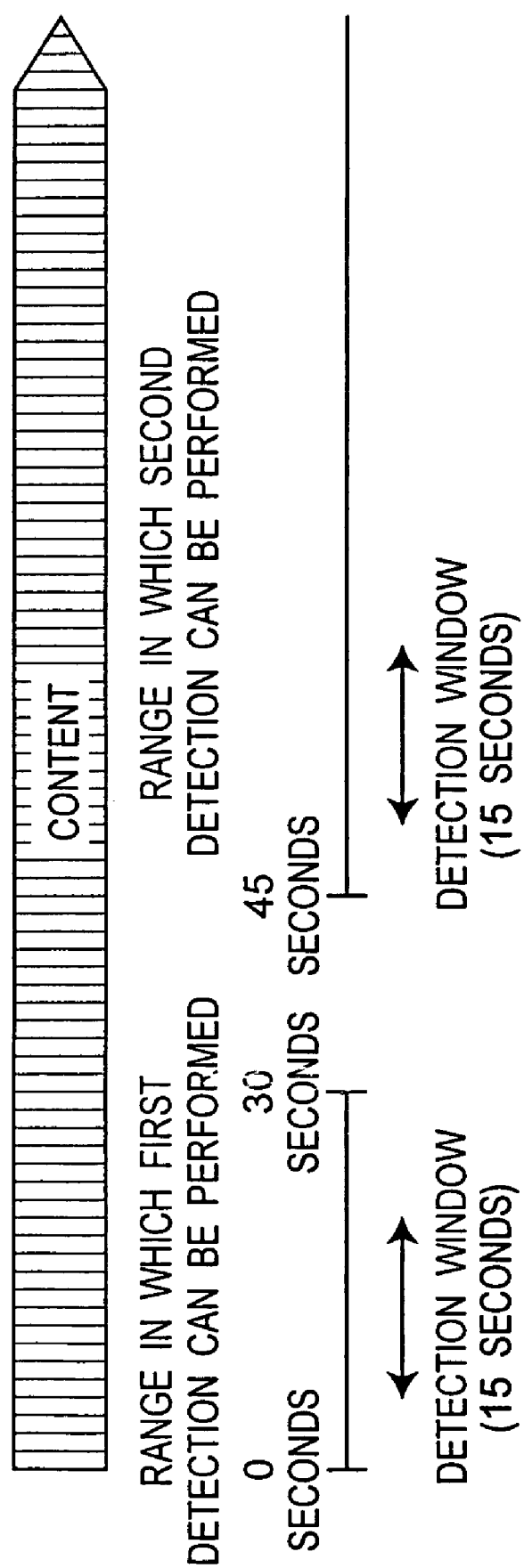
FIG. 12 is a view showing an example of the timing of digital watermark detection.

As shown in the above-mentioned FIG. 12, digital watermark detection is carried out once or twice. In the case that the second digital watermark detection is necessary according to the result of the first digital watermark detection, part of the content, located from the end point of the first detection window to the start point of the second detection window, is skipped, and detection operation starts immediately from the start point of the second detection window.

Furthermore, in the case that-the processing capacities of the decoding section 105 and the digital watermark detection section 106 are sufficient, the detection operation may be carried out at speed higher than the specified reproduction speed. For example, in the case that the linear PCM audio signal, which is reproduced usually at a sampling frequency of 44.1 kHz, is decoded at a speed of 88.2 kHz, the detection operation can be completed in 7.5 seconds, although ordinary detection operation takes 15 seconds.

Figure 2:
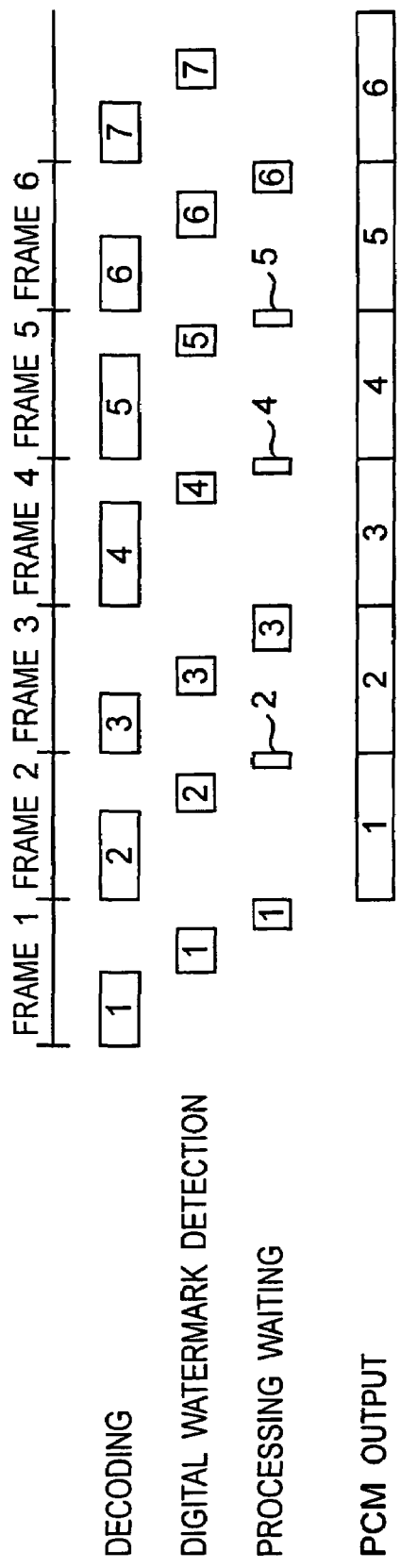
FIG. 2(a) is a view showing the timing of decoding and digital watermark detection during ordinary reproduction.
FIG. 2(b) is a view showing the timing of decoding and digital watermark detection according to Embodiment 1.

Moreover, processing for increasing the speed of the decoding processing and the digital watermark detection processing will be described below using FIG. 2. The horizontal axis in FIG. 2 represents time. The decoding processing and the digital watermark detection processing for ordinary reproduction are carried out frame by frame, each frame comprising a constant number of PCM samples, and the linear PCM audio signal stored in a PCM buffer is output at a constant speed according to the sampling frequency in the next frame, as shown in FIG. 2(a). For example, in MP3 (MPEG1), one frame consists of 1152 samples of the linear PCM audio signal. When the sampling frequency is 44.1 kHz, one frame requires approximately 26 msec. On the other hand, the processing time required for the decoding and the digital watermark detection will change depending on the details of the compressed audio bit stream. If the processing time becomes longer than the frame time, sound is interrupted. Hence, the apparatus is designed so that the processing is completed in a time shorter than the frame time and so that the state of waiting for the start of the next frame is obtained. However, in Embodiment 1, during the digital watermark detection, the linear PCM audio signal is not required to be output so as to be heard as sound. Hence, the processing waiting time can be skipped, and the processing can be carried out continuously, as shown in FIG. 2(b). As a result, the time for the detection operation having no processing waiting and shown in FIG. 2(b) can be made shorter by 20 to 30% than the time for the detection operation in the ordinary reproduction shown in FIG. 2(a).

As described above, in the case that the reproduction start command has been input by the reproduction start operation of the user, before the reproduction of the unprotected content 103, the attached information serving as a digital watermark and embedded in the content is detected, and reproduction control is carried out according to the detected attached information. Hence, inconvenient operation, such as reproduction stoppage in the middle of reproduction, does not occur in the reproducing apparatus 109. In addition, in the reproducing apparatus 109, the attached information is checked before reproduction without outputting sound to the outside of the reproducing apparatus 109. Hence, the checking of the attached information can be processed quickly, and the processing of portions of the content, not required to be processing, can be omitted. This produces an effect of raising the efficiency of the detection processing.

The attached information in Embodiment 1 is distributed in the entire area of the content having a predetermined length, integrated with the content, and related to the reproduction control of the content.

Furthermore, as described above, a digital watermark is information embedded in a multimedia content, such as a still image, a moving image or audio data, so as not to be perceivable by human beings using the characteristics of the sensory perception of human beings, and is information different from the content itself. In other words, information different from the content is embedded in the content itself by adding a minor change unperceivable by human beings to the content. In Embodiment 1, digital watermarking is carried out using the echo control method.

The echo control method being used in Embodiment 1 will be described below.

Digital watermark information can be embedded by adding an echo effect on an audio signal. When the time difference between the original audio signal and the echo becomes a constant value (approximately 1 msec) or less, it is perceived to human ears that the original sound and the echo are merged. Hence, two kinds of echoes having delay times shorter than this value (approximately 1 msec), being set to "0" and "1," are used as watermark data, and added to the original audio signal, whereby a signal embedded with the watermark data can be created. The digital audio signal is divided into constant sections (each having 512 samples, for example), and one of the two kinds of echoes is added to each section according to the watermark data. For high sound quality, echo switching at the division portion should be done gradually instead of stepwise. For the purpose of embedding multi-bit information, sections, the number of which corresponds to the number of bits, are required. Furthermore, a synchronous bit string for indicating the start point of a bit string is also required. The echo control method treats such bit data collectively. For example, when it is assumed that the main digital watermark data to be embedded as a digital watermark has eight bits and that the synchronous digital watermark data has eight bits, the total number of bits is 16. When the digital watermark is embedded in a digital audio signal having a sample rate of 44.1 kHz, a digital audio signal of approximately 186 msec is required. Furthermore, in the case that a digital audio signal is converted into an analog signal by D/A conversion, or subjected to compression processing, such as MP3, the analysis of the digital watermark information becomes difficult owing to the influence of noise at a location in which the amplitude of the audio signal is small. Hence, it is necessary to raise reliability by embedding the same data many times and by using majority decision processing at the time of detection. Therefore, for the purpose of detecting reliable digital watermark information, a digital audio signal of several seconds to several dozen seconds is necessary depending on operational procedures.

Because the restoration (detection) of the watermark data can be done only by measuring the delay time between the original audio signal and the echo, the autocorrelation function of the signal is obtained. The cepstrum technique being used for sound signal analysis may also be applied for this purpose. A delay time is obtained by calculating the autocorrelation function. By the sequential calculation of the delay time, a data string comprising "0" and "1" is obtained. When a synchronous pattern is detected from this data string, the main watermark data, which is embedded so that the head thereof is located at the detection position, is captured. When the same data is detected a predetermined number of times from an audio signal of a constant time, it is assumed that the detected data is a detection value and serves as watermark data. With this detection processing, reliability can be improved.

Embodiment 2

Figure 3:
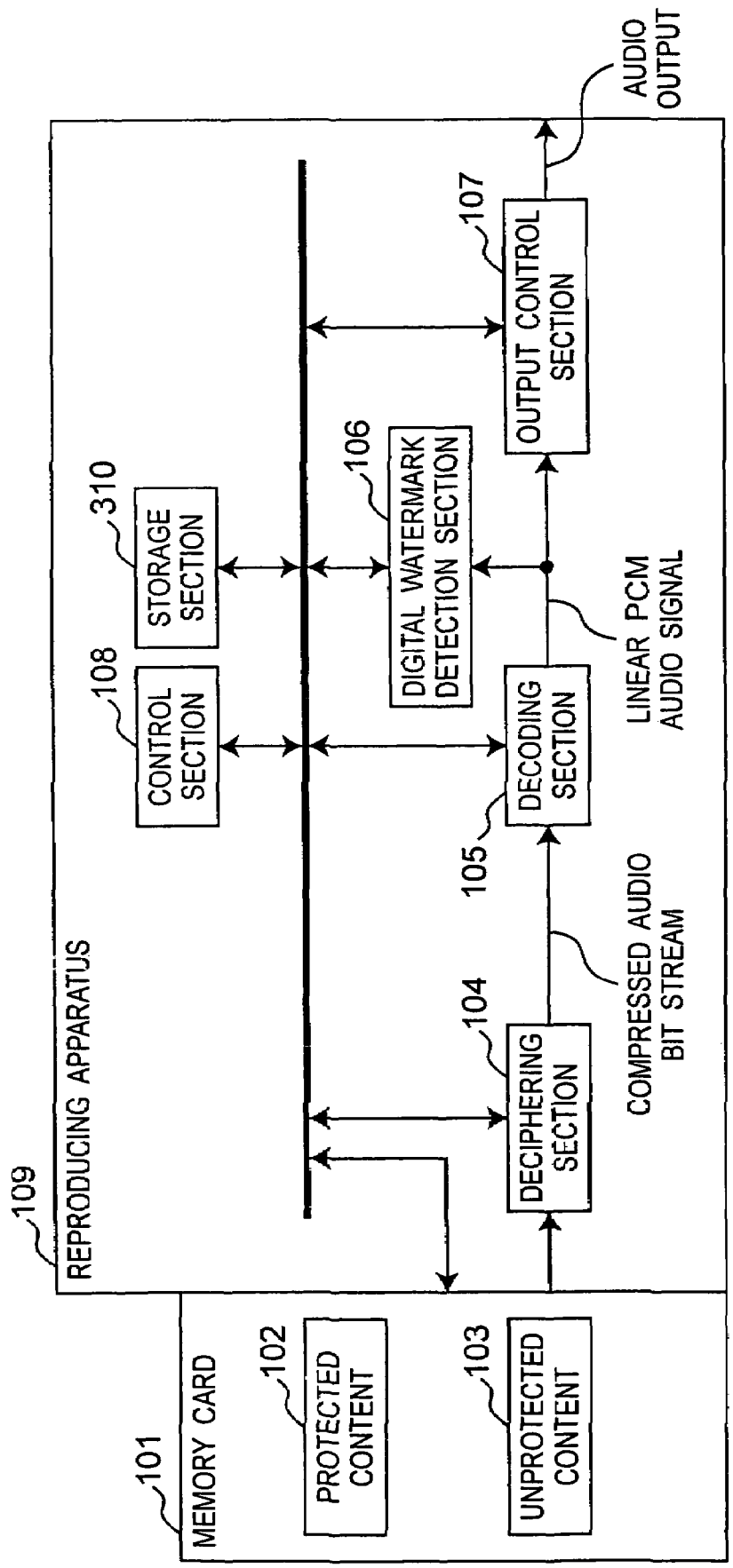
FIG. 3 is a block diagram showing the configuration of a reproducing apparatus 209 according to Embodiment 2 of the present invention.

FIG. 3 is a block diagram showing the configuration of a reproducing apparatus 209 according to Embodiment 2 of the present invention. In the reproducing apparatus 209 shown in FIG. 3, the components having the same functions and configurations as those of the components of the reproducing apparatus 109 shown in the above-mentioned FIG. 1 are designated by the same numerals, and the descriptions in Embodiment 1 are applied to their descriptions.

In FIG. 3, a protected content 102 serving as enciphered compressed audio data and an unprotected content 103 serving as unenciphered compressed audio data are recorded on a memory card 101 serving as a medium for recording contents and the like. Multiple protected contents 102 and multiple unprotected contents 103 may also be present in the memory card 101. A deciphering section 104 checks whether a content obtained from the memory card 101 is enciphered or not, and deciphers the content if it is enciphered. A decoding section 105 decodes the unenciphered compressed audio stream that is output from the deciphering section 104. A digital watermark detection section 106 detects a digital watermark from a linear PCM audio signal that is output from the decoding section 105. An output control section 107 controls the output of the linear PCM signal. A storage section 310 stores the unprotected content 103 and the digital watermark detected using the digital watermark detection section 106 so as to correspond to each other, using a method capable of preventing falsification or a method capable of detecting falsification. A control section 108 controls the memory card 101, the deciphering section 104, the decoding section 105, the digital watermark detection section 106, the output control section 107 and the storage section 310. The reproducing apparatus 209 according to Embodiment 2 comprises the deciphering section 104, the decoding section 105, the digital watermark detection section 106, the output control section 107, the control section 108 and the storage section 310. In the reproducing apparatus according to Embodiment 2, its detection section is formed of the digital watermark detection section 106.

The reproducing operation of the reproducing apparatus 209 according to Embodiment 2, configured as described above, will be described below.

Figure 4:
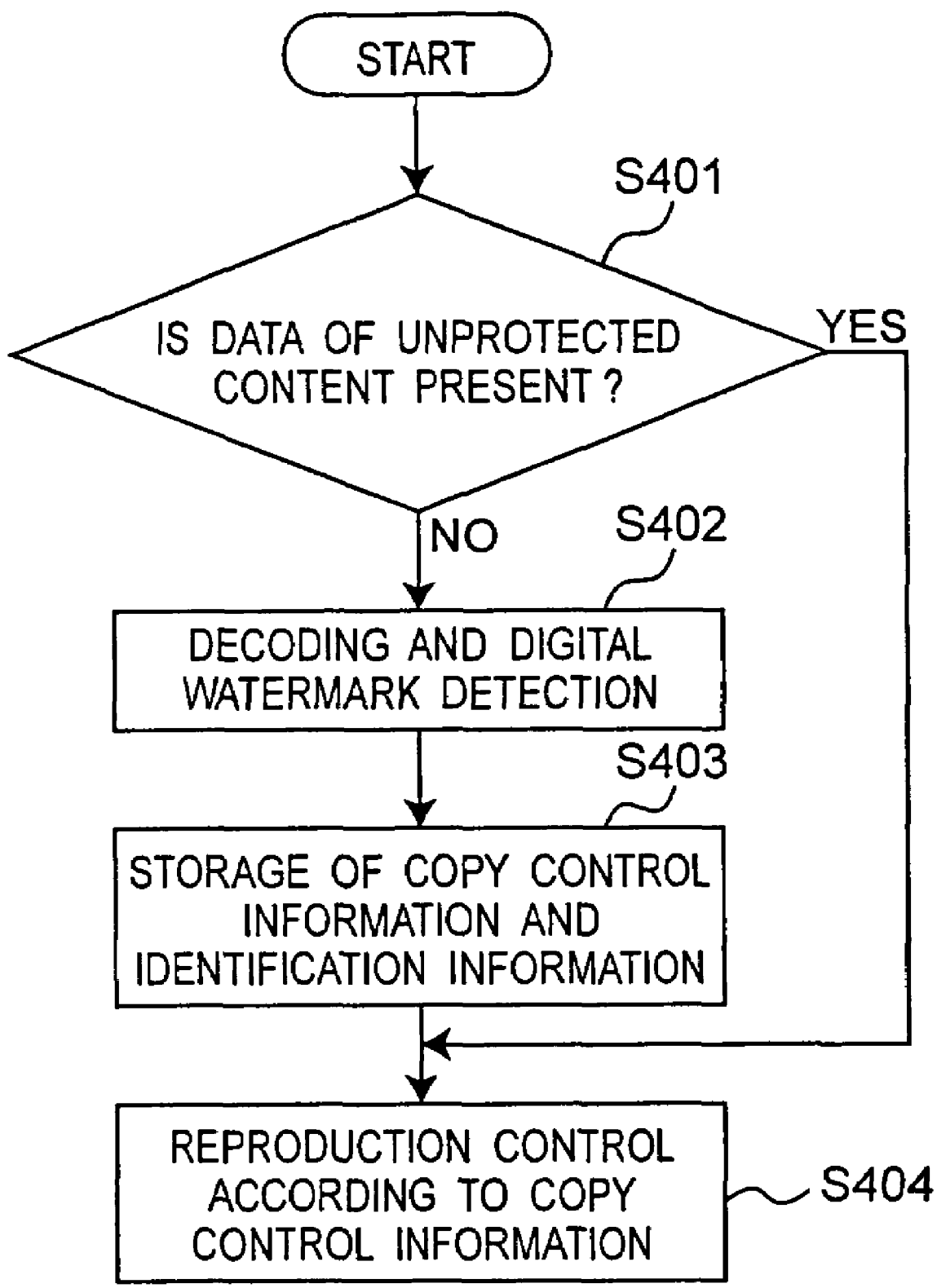
FIG. 4 is a flowchart showing processing immediately after a memory card 101 is inserted into the reproducing apparatus 209 according to Embodiment 2.

FIG. 4 is a flowchart showing the reproducing operation of the reproducing apparatus 209 according to Embodiment 2. When the operation for reproducing the unprotected content 103 is carried out by the user, and a reproduction start command is input, a check is carried out as to whether the data of the unprotected content 103 is present or not in the storage section 310. More specifically, the identification information of the memory card 101, the file name of the unprotected content 103, etc. are checked as keys. Furthermore, in the case that the data of the unprotected content 103 is present, a check is carried out as to whether the data is valid or not. Although the data itself in the storage section 310 is stored using a method capable of preventing the user from making falsification or a method capable of detecting falsification, there is a possibility that the corresponding unprotected content 103 itself is rewritten. Hence, it is necessary to confirm whether the two properly correspond to each other or not. For example, a check is carried out as to whether the time stamp, file size, etc. of the unprotected content 103 stored in the storage section 310 coincide with the time stamp, file size, etc. of the actual unprotected content 103. Alternatively, it may be possible that the hash value of the unprotected content 103 is stored in the storage section 310 during the digital watermark detection, that the hash value of the unprotected content 103 is calculated again during usage, and that the correspondence relationship is confirmed by checking whether the two coincide with each other or not (at step 401). The hash value is digest information obtained by processing original information (the unprotected content 103 in this example) using a hash function. The hash function is a function having (1) a one-way property (a property indicating that it is difficult to obtain original information from the hash value), and (2) a collision-free property (a property indicating that a completely different hash value is generated even if information is different from original information in only one bit and that it is difficult to find two different original information items having the same hash value). For the function, a block cipher is used, or a dedicated hash function, such as SHA-1, is used.

If the valid data of the unprotected content 103 is present in the storage section 310, reproducing operation is carried out immediately according to the valid data. In other words, in the case that the copy control information of a digital watermark indicating the "copy-prohibited" state is embedded, reproduction is not carried out. On the other hand, in the case that the copy control information of digital watermarks indicating the "copy-free" state and the "copy-limited" state, other than the "copy-prohibited" state, is embedded, reproduction is carried out, without carrying out digital watermark detection again.

If the data of the unprotected content 103 is not valid, first, the invalid data of the unprotected content 103 stored in the storage section 310 is deleted. Then, the compressed audio bit stream obtained from the unprotected content 103 is decoded using the decoding section 105. Furthermore, a digital watermark is detected from the linear PCM audio signal that is output from the decoding section 105 (at step 402).

When the digital watermark is detected, the details of the detection (copy control information) and the identification information (the identification code of the memory card 101, file name, time stamp, file size, hash value, etc.) of the unprotected content 103 corresponding thereto are stored in the storage section 310 (at step 403). Then, reproducing operation is carried out according to the copy control information (at step 404).

In the case that the details of the detection and the identification information of the unprotected content 103 corresponding thereto are stored in the storage section 310, the storage is required to be carried out using a method capable of preventing falsification or a method capable of detecting falsification.

As methods capable of preventing falsification, a method capable of physically preventing access to the storage section 310, a method of enciphering stored contents, and the like are known. As methods of physically preventing access, a method of carrying out all the processing within semiconductors that cannot be accessed externally, a method of using a BGA (ball grid array) package in which when data is transferred to an external bus, at least part of the bus is disposed inside a circuit board, and the terminals of an LSI are disposed between the LSI and the circuit board, a method of making signals flowing on a bus difficult to capture by sealing the terminals of an LSI with resin or the like, and the like are known. In addition, in the case that data is enciphered, such an above-mentioned method capable of physically preventing access to a cipher key is necessary so that the key for encipherment is not leaked out. Furthermore, in the case that the details of the detection or the identification information of the unprotected content 103 corresponding thereto are renewed to prevent save/restore attacks, the information relating to key generation may also be renewed.

A method, in which when the details of the detection and the identification information of the unprotected content 103 corresponding thereto are recorded, the hash values of these are recorded simultaneously, the hash values are calculated again during usage, and a check is carried out as to whether the recorded hash values coincide with the calculated hash values, is known as a method capable of detecting falsification.

Next, a case, in which on the basis of the hash information embedded in a content, serving as an example of attached information being used in Embodiment 2, the validity of the content is checked, and reproduction control is carried out, will be described below.

Recently, pirated prerecorded disks have been sold. They are made, for example, on the basis of contents obtained by carrying a video camcorder in a movie theater and by recording movies using the video camcorder, or on the basis of contents obtained by capturing the contents of DVD disks, television broadcast programs, etc. using the capture board of a personal computer. For the purpose of distinguishing these pirated disks from legitimate disks and of excluding the pirated disks, a system is used in which a enciphered signature is added to each contents of the legitimate disk, and the signature on the disk serving as a recording medium is checked in a recording apparatus. With the use of this system, the reproduction of a disk that is not confirmed to be legitimate is prohibited.

Figure 5:
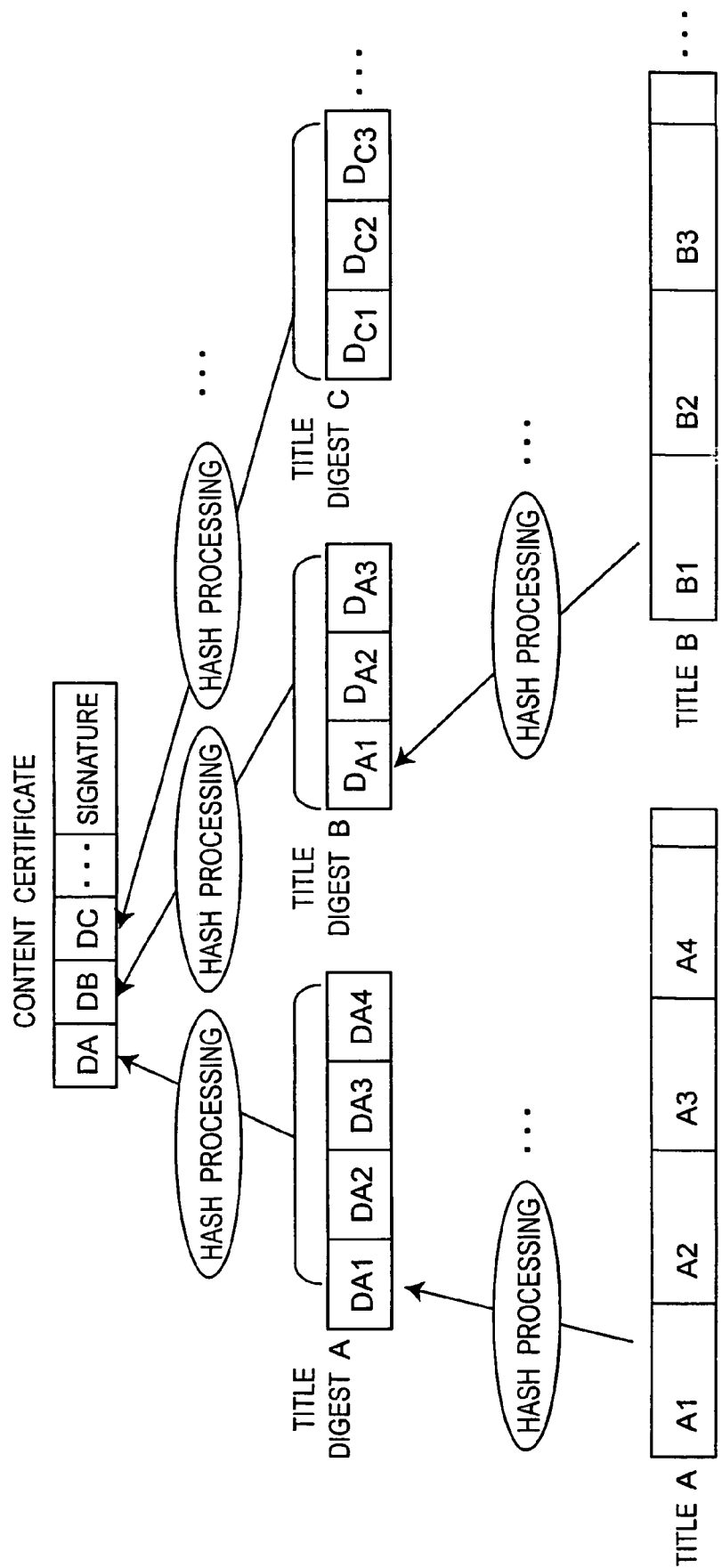
FIG. 5 is a view schematically showing a signature checking system.

The above-mentioned system will be described below referring to FIG. 5. FIG. 5 is a view schematically showing a signature checking system. In FIG. 5, Title A designates a bunch of data, such as a movie or a piece of music, formatted in MPEG2 or the like. Title B designates a bunch of data as in Title A. Title digest A stores the hash value of each predetermined length of Title A. Title digest B stores the hash value of each predetermined length of Title B. Title digest C stores the hash value of each predetermined length of Title C (not shown). A content certificate stores the hash values of the respective Title digests A, B and C, and a signature assigned thereto. The items ranging from Title A to the content certificate shown in FIG. 5 are recorded on a prerecorded disk.

The creation of the content certificate and the title digests will be described below.

A disk manufacturer divides each title into hash units having a predetermined length (for example, 100 Kbytes). Each hash unit is subjected to hash processing, converted into a digest value, and stored in a title digest. For example, the hash unit A1 of Title A is converted into the digest value DA1 of Title digest A. The portion at the end of a title, less than the hash unit, is ignored. When the calculation of each title digest value is completed, the hash value of the whole of each title digest is calculated, and the hash value (DA) obtained by the calculation is stored as a digest value in the content certificate. The digest values DA, DB, DC, . . . obtained by the calculation are stored in the content certificate sequentially. The disk manufacturer stores the digest values of all the titles on the disk, and delivers the data to an authentication organization. The authentication organization calculates the hash value for the digest values of all the titles. The hash value obtained by the calculation is enciphered using the secret key of the authentication organization and is used as a signature. This signature is delivered to the disk manufacturer. The disk manufacturer stores the certificate with the signature on disks together with the tiles and the title digests, and sells the disks.

Next, processing during disk reproduction will be described below. When a disk is inserted into the reproducing apparatus, the reproducing apparatus reads the content certificate stored on the disk and calculates the hash value for the digest values of all titles. On the other hand, the signature stored in the content certificate is decoded using the public key of the authentication organization, the key being stored beforehand in the reproducing apparatus using a method capable of preventing falsification, and the hash value on which the signature is based is captured. Then, a check is carried out as to whether the hash value obtained by decoding coincides with the hash value obtained by the calculation carried out in the reproducing apparatus itself. Furthermore, the reproducing apparatus randomly selects several hash units, for example, five hash units, from the disk, and calculates the hash value thereof. A check is then carried out as to whether the hash value obtained by the calculation coincides with the digest value stored in the title digest of the titles relating to the hash units recorded on the disk. Furthermore, the hash value of the entire title digest is calculated, and a check is carried out as to whether the hash value obtained by the calculation coincides with the digest value stored in the content certificate recorded on the disk.

In the case that an inconsistency occurs in any of the checks described above, the disk being checked is regarded as illegitimate, and the use of the disk, including reproduction and copying, is prohibited completely.

As described above, the hash information of the content is not concentrated in the header or other specific areas of the content, but distributed in the entire content portion having a predetermined length and integrated with the content. Hence, if checking is carried out while reproduction is performed as in the conventional reproducing apparatus, an inconvenient state, such as reproduction stoppage in the middle of reproduction, occurs as in the case of the conventional reproducing apparatus. Therefore, in the reproducing apparatus and the reproducing method according to Embodiment 2 of the present invention, the hash information serving as attached information is captured and checked before reproduction, and reproduction control is carried out according to the result of the checking, as in the case of digital watermarking. As a result, in the reproducing apparatus and the reproducing method according to Embodiment 2, reproduction stoppage in the middle of reproduction according to the result of the checking of the attached information does not occur.

In the case that the storage capacity of the storage section 310 in the reproducing apparatus according to Embodiment 2 becomes full, part of data is deleted. There are many deleting methods, such as a method in which data is deleted in the order of the oldest, and a method in which data is deleted in the order of the longest time since the last access.

Furthermore, at step 402 shown in FIG. 4, in the case that a digital watermark is detected, the output control section 107 can mute the audio output. In this case, high-speed detection is made possible as in the case described in the above-mentioned Embodiment 1.

As described above, in Embodiment 2, the attached information embedded as a digital watermark is detected, and the result of the detection is stored in the storage section 310. In the case that there is attached information having already been detected when the user carries out reproduction start operation, reproduction control is performed according to the attached information. Hence, in the reproducing apparatus according to Embodiment 2, inconvenient operation, such as reproduction stoppage in the middle of reproduction, does not occur. Furthermore, when the recording medium is inserted into the reproducing apparatus again, only the valid information of the attached information that has been stored the last time is used, and it is thus not necessary to newly check the attached information. For this reason, an excellent effect of completing the detection more quickly is obtained.

Embodiment 3

Figure 6:
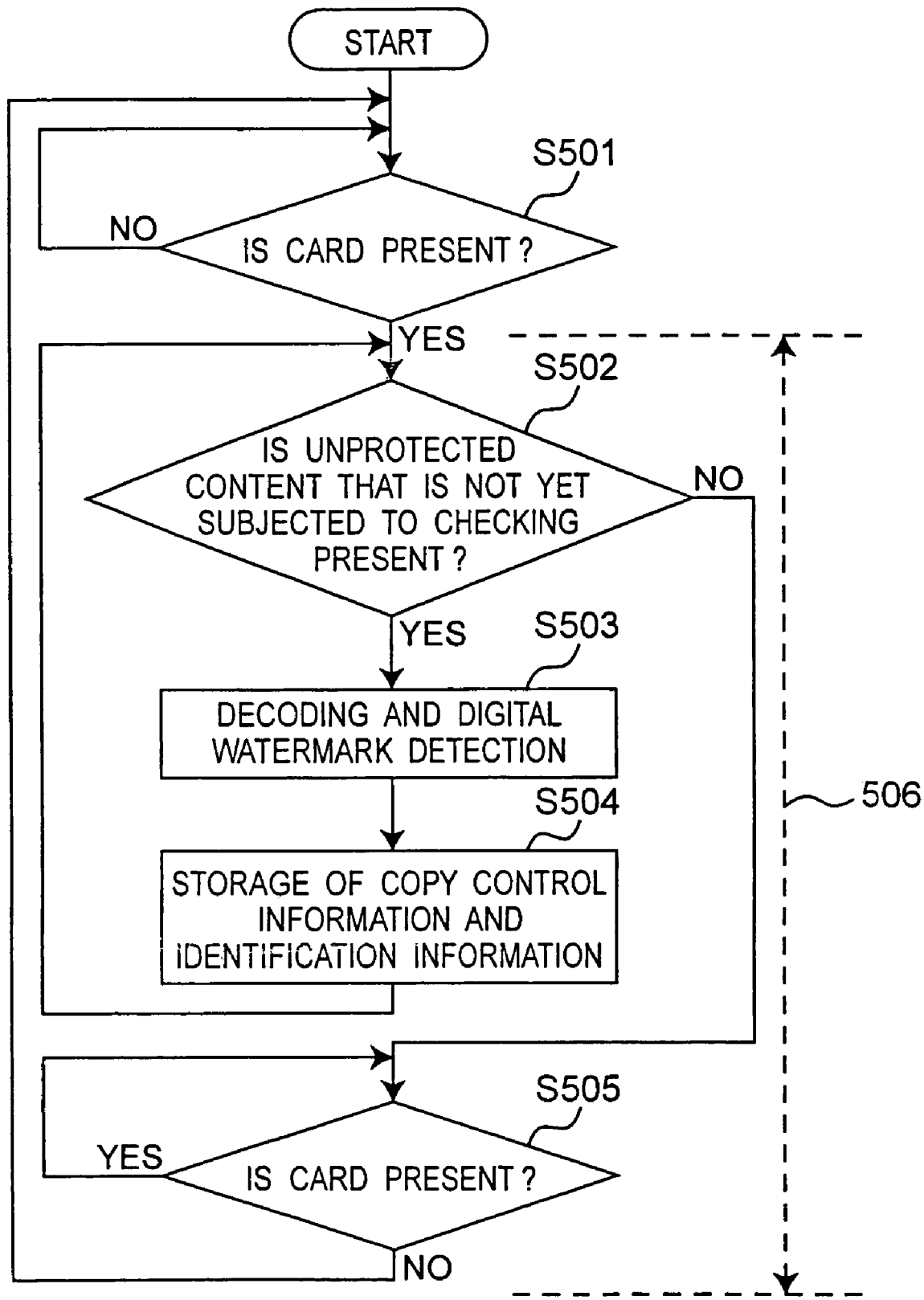
FIG. 6 is a flowchart showing processing immediately after the memory card 101 is inserted into the reproducing apparatus 209 according to Embodiment 3.

Next, a reproducing apparatus according to Embodiment 3 of the present invention will be described below. The configuration of the reproducing apparatus according to Embodiment 3 is substantially the same as that of the reproducing apparatus according to Embodiment 2 shown in the above-mentioned FIG. 3. Hence, the operation of the reproducing apparatus according to Embodiment 3 will be described using FIGS. 3 and 6. FIG. 6 is a flowchart showing the processing immediately after the memory card 101 is inserted into the reproducing apparatus 209 according to Embodiment 3.

In FIG. 6, the reproducing apparatus 209 is in a state of waiting for the insertion of the memory card 101 at step 501. When the memory card 101 is inserted, a check is carried out automatically as to whether an unprotected content 103 not yet subjected to digital watermark checking is included in the memory card 101 or not (at step 502), even if the user does not carry out reproducing operation. If an unprotected content 103 not yet subjected to digital watermark checking is included, the compressed audio bit stream obtained from the unprotected content 103 is decoded using the decoding section 105. Furthermore, a digital watermark is detected from a linear PCM audio signal that is output from the decoding section 105 (at step 503). At this time, the decoded linear PCM audio signal is muted so as not to be output to the outside of the reproducing apparatus. When the digital watermark is detected, the identification information of the unprotected content 103, corresponding to the details of the detection (copy control information), is stored in the storage section 310 (at step 504). The processing of the digital watermark information of one unprotected content 103 is completed by the procedure described above. If the information of the unprotected content 103 is displayed on the display section (not shown) of the reproducing apparatus 209, the result of the digital watermark detection may also be reflected on the display. For example, in the case that the names of the files in the unprotected content 103 stored in the card 101 are displayed, there are many display methods. For example, files unable to be reproduced are indicated by a small cross mark, or the names of the files are not displayed at all.

When the processing of one unprotected content 103 is completed, the procedure returns to step 502, and a check is carried out as to whether an unprotected content 103 not yet subjected to checking is present or not.

If an unprotected content 103 not yet subjected to checking is present, digital watermark information detection is carried out in a similar way. If there is no unprotected content 103 not yet subjected to checking, the procedure enters a loop for monitoring whether the memory card 101 is withdrawn or not (at step 505).

The time required for the above-mentioned series of digital watermark checking processing is several seconds to several dozen seconds per content. In the case that the user carries out operation to reproduce the unprotected content 103 in the middle of this processing period (the interruption receiving period 506 indicated by a broken line with two arrows at the ends in FIG. 6), interruption processing occurs in the digital watermark checking processing. The details of the interruption are similar to those described in the above-mentioned Embodiment 2.

As described above, in Embodiment 3, if the digital watermark detection section 106 is in a state of being able to detect the attached information of the unprotected-content 103, the digital watermark detection section 106 automatically detects the attached information embedded as a digital watermark even if the user does not carry out reproduction start operation (reproduction start command), and stores the information in the storage section 310. In the case that the user has carried out reproduction start operation, reproduction control is performed according to the attached information having already been detected. Hence, inconvenient operation, such as reproduction stoppage in the middle of reproduction, does not occur. Furthermore, before reproduction, the attached information is checked without outputting sound to the outside of the reproducing apparatus 209. Therefore, high-speed processing is made possible, and the processing of portions of the content, not required to be processed can be omitted. This produces an effect of raising the efficiency of the detection processing.

The digital watermark detection section 106 may also be configured so that the attached information of the content is detected and stored in the storage section 310 regardless of the operation of the user, provided that the attached information of the content is in a detectable state.

Embodiment 4

Figure 7:
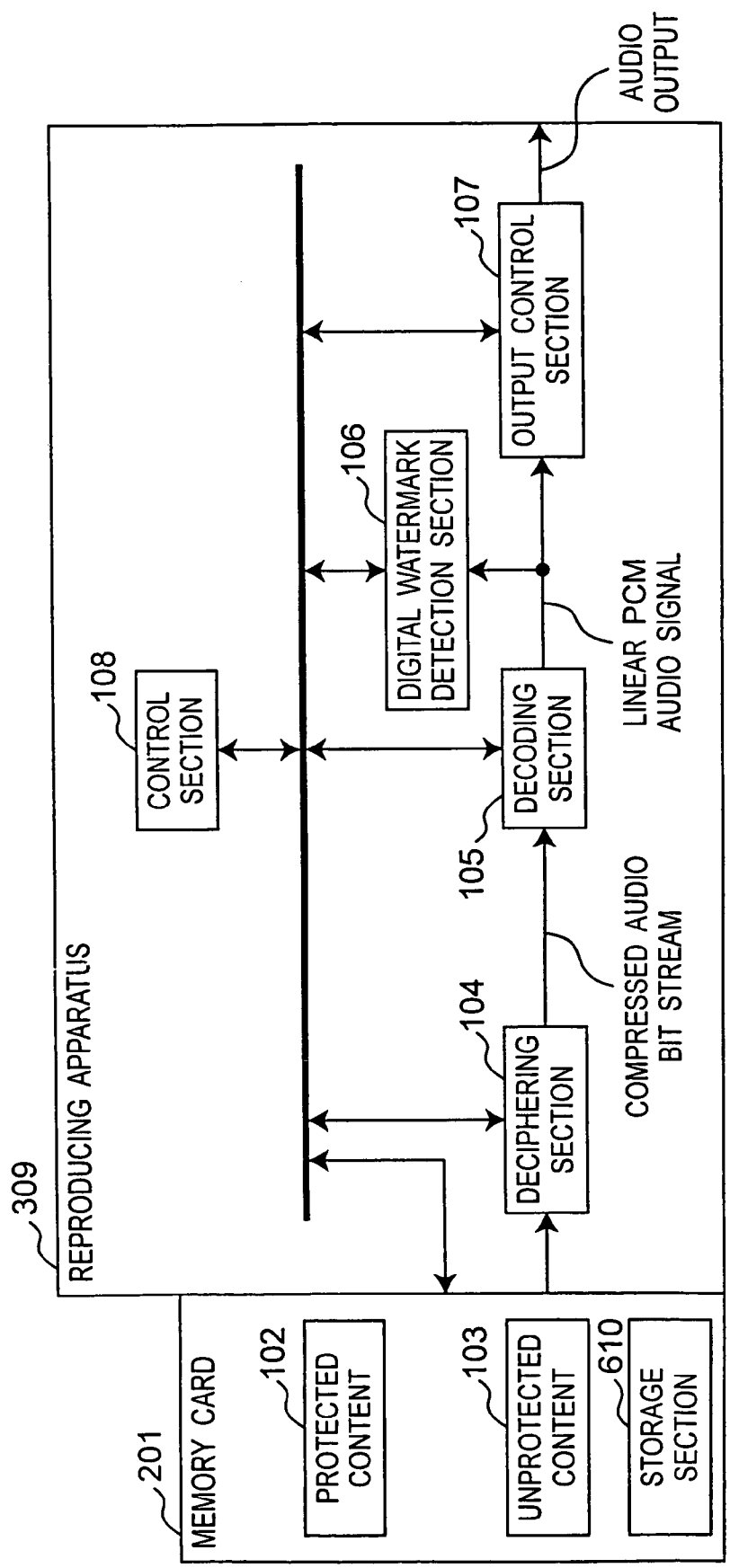
FIG. 7 is a block diagram showing the configuration of a reproducing apparatus 309 according to Embodiment 4.

FIG. 7 is a block diagram showing the configuration of a reproducing apparatus 309 according to Embodiment 4 of the present invention. In the reproducing apparatus 309 shown in FIG. 7, the components having the same functions and configurations as those of the components of the reproducing apparatus 109 shown in the above-mentioned FIG. 1 are designated by the same numerals, and the descriptions in Embodiment 1 are applied to their descriptions.

In FIG. 7, a protected content 102 serving as enciphered compressed audio data and an unprotected content 103 serving as unenciphered-compressed audio data are recorded in a memory card 201 serving as a medium for recording contents and the like. Furthermore, the memory card 201 is provided with a storage section 610 that stores the unprotected content 103 and the digital watermark detected using the digital watermark detection section 106 so as to correspond to each other in a method capable of preventing the user from making deciphering and falsification. Multiple protected contents 102 and multiple unprotected contents 103 may also be present. The deciphering section 104 of the reproducing apparatus 309 checks whether the content obtained from the memory card 201 is enciphered or not, and deciphers the content if it is enciphered. A decoding section 105 decodes unenciphered compressed audio stream that is output from the deciphering section 104. A digital watermark detection section 106 detects a digital watermark from a linear PCM audio signal that is output from the decoding section 105. An output control section 107 controls the output of the linear PCM signal. A control section 108 controls the memory card 201, the deciphering section 104, the decoding section 105, the digital watermark detection section 106 and the output control section 107. The reproducing apparatus according to Embodiment 4 comprises the deciphering section 104, the decoding section 105, the digital watermark detection section 106, the output control section 107 and the control section 108. In the reproducing apparatus according to Embodiment 4, its detection section is formed of the digital watermark detection section 106.

The operation of the reproducing apparatus 309 according to Embodiment 4, configured as described above, will be described below.

Figure 8:
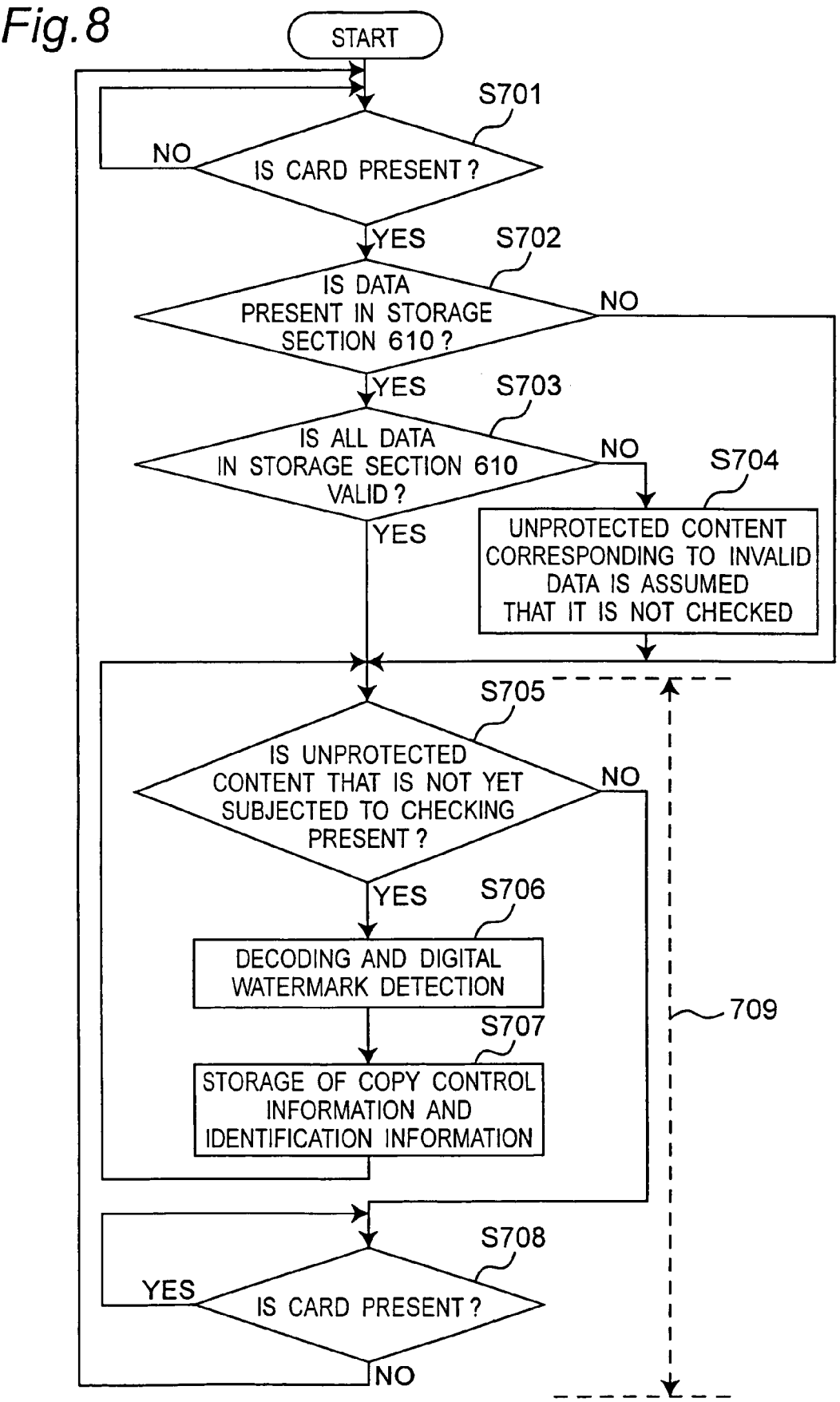
FIG. 8 is a flowchart showing processing immediately after a memory card 201 is inserted into the reproducing apparatus 309 according to Embodiment 4.
Figure 10:
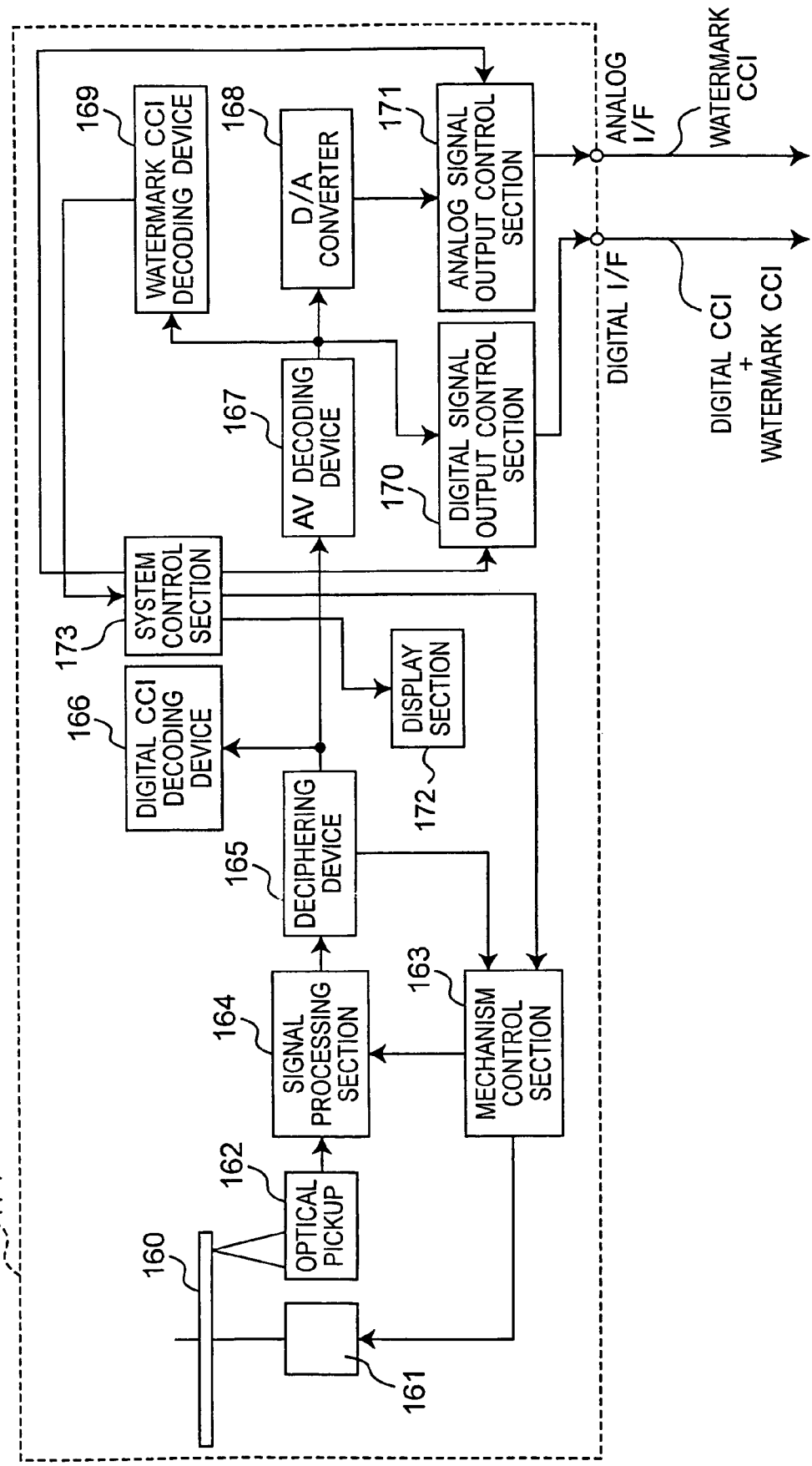
FIG. 10 is a block diagram showing the configuration of the optical disk reproducing apparatus that uses the conventional copy control method.
Figure 11:
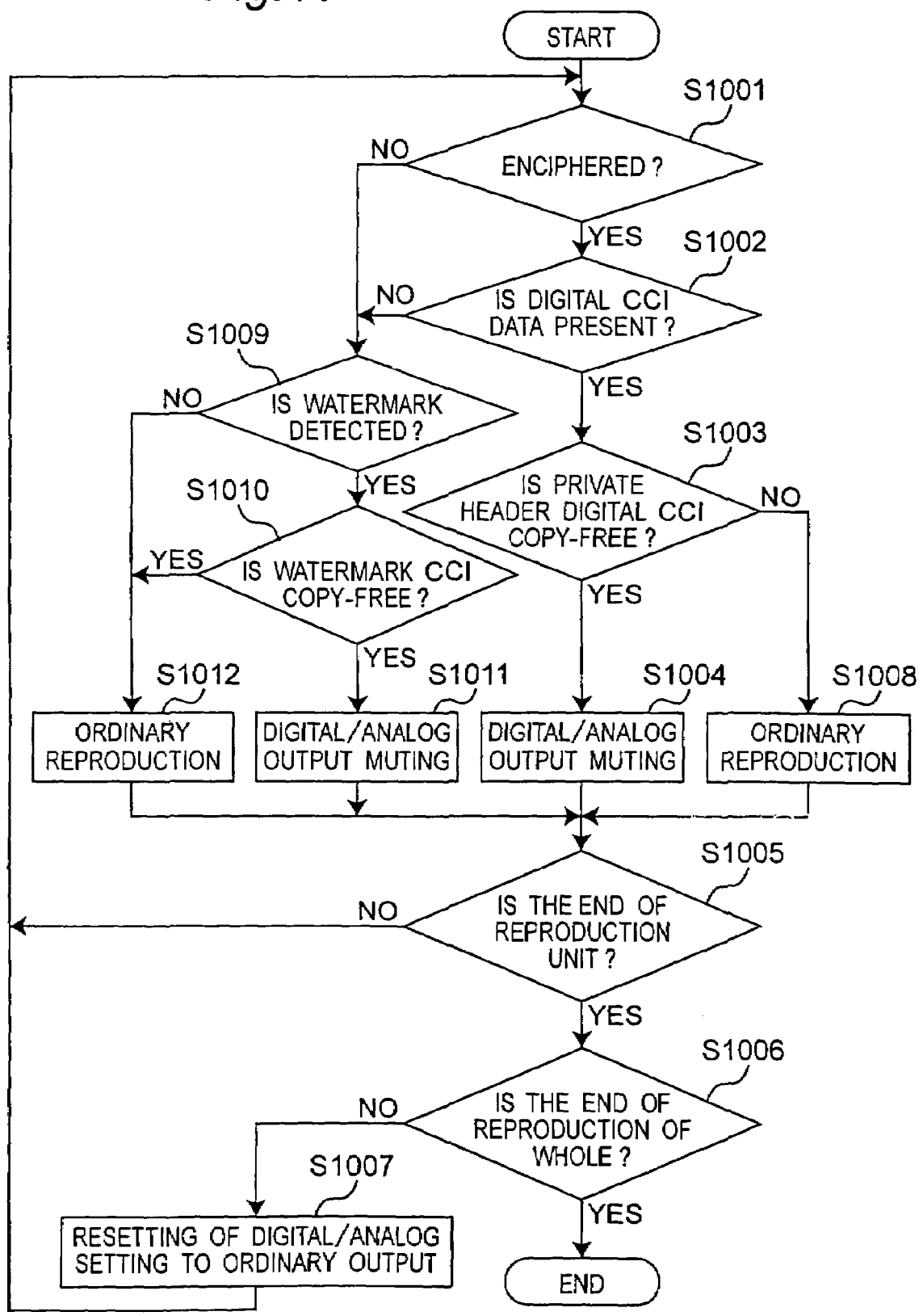
FIG. 11 is a view showing the copy control flow during conventional reproduction.

FIG. 8 is a flowchart showing the processing immediately after the memory card 201 is inserted into the reproducing apparatus 309 according to Embodiment 4. At step 701, the reproducing apparatus 309, according to Embodiment 4 is in a state of waiting for the insertion of the memory card 201. When the memory card 201 is inserted, a check is carried out as to whether data is present or not in the storage section 610 of the memory card 201 (at step 702). In the case that no data is present in the storage section 610, the procedure advances to step 705.

If data is present in the storage section 610, a check is carried out as to whether all the data is valid or not (at step 703). Although the data itself in the storage section 610 is stored using a method capable of preventing the user from making deciphering and falsification or a method capable of detecting falsification, there is a possibility that the corresponding unprotected content 103 itself is rewritten or deleted. Hence, it is necessary to confirm whether the two properly correspond to each other or not. For example, a check is carried out as to whether the time stamp, file size, etc. of the unprotected content 103 stored in the storage section 610 coincide with the time stamp, file size, etc. of the actual unprotected content 103. Alternatively, it may be possible that the hash value of the unprotected content 103 is stored in the storage section 610 during the digital watermark detection, that the hash value of the unprotected content 103 is calculated again during usage, and that the correspondence relationship is confirmed by checking whether the two coincide with each other or not. If not all the data is valid, invalid data is deleted, and the unprotected content 103 corresponding thereto is assumed that it is not yet checked (at step 704). With the use of the above-mentioned processing, data checking in the storage section 610 is completed. Because the processing periods for the above-mentioned steps 702, 703 and 704 are short, these steps are carried out immediately when the memory card 201 is inserted. In these processing periods, the reproduction start operation by the user is in a state of waiting for the completion of the processing.

If the information of the unprotected content 103 is displayed on the display section (not shown) of the reproducing apparatus 309, the contents of the storage section 610 of the memory card 201 may also be reflected on the display. For example, in the case that the names of the files in the unprotected content 103 stored in the card 201 are displayed, there are many display methods. For example, files unable to be reproduced are indicated by a small cross mark, or the names of the files are not displayed at all.

After the checking of the data of the storage section 610 is completed, a check is carried out as to whether an unprotected content 103 not yet subjected to digital watermark checking is included in the memory card 201 or not (at step 705). If an unprotected content 103 not yet subjected to digital watermark checking is included in the memory card 201, the compressed audio bit stream obtained from the unprotected content 103 is decoded using the decoding section 105. Furthermore, a digital watermark is detected from a linear PCM audio signal that is output from the decoding section 105 (at step 706). At this time, the decoded linear PCM audio signal is muted using the output control section 107 so as not to be output to the outside of the reproducing apparatus. Hence, high-speed processing and the like are made possible. When the digital watermark is detected, the identification information (the file name, time stamp, file size, hash value, etc.) of the unprotected content 103 corresponding to the details of the detection (copy control information) is stored in the storage section 610 using a method capable of preventing the user from making falsification (at step 707). As examples of the method, the information is uniquely enciphered to disable access to the stored contents, or the information is stored in a storage area that is not accessible by the user, and when the information is delivered to an apparatus, the information is authenticated, enciphered and then delivered.

The processing of the digital watermark information of one unprotected content 103 is completed by the procedure described above. If the information of the unprotected content 103 is displayed on the display section (not shown) of the reproducing apparatus 309, the result of the digital watermark detection may also be reflected on the display.

When the processing of one unprotected content 103 is completed, the procedure returns to step 705, and a check is carried out as to whether an unprotected content 103 not yet subjected to checking is present or not. If an unprotected content 103 not yet subjected to checking is present, digital watermark information detection is carried out in a similar way. If there is no unprotected content 103 not yet subjected to checking, the procedure enters a loop for monitoring whether the card is withdrawn or not (at step 708).

The time of the period (the interruption receiving period indicated by numeral 709 in FIG. 8) required for the series of digital watermark checking processing at steps 705, 706 and 707 described above is several seconds to several dozen seconds per content. In the case that the user has carried out operation to reproduce an unprotected content 103 in the middle of this processing, interruption processing occurs in the digital watermark checking processing.

The details of the reproduction processing that interrupts the digital watermark checking processing is the same as the interruption processing described in the above-mentioned Embodiment 3, except for the method of writing information in the memory card 610.

As described above, in Embodiment 4, the digital watermark detection section automatically detects the attached information embedded as a digital watermark, and stores the result in the recording medium itself. In the case that the user has carried out reproduction start operation, reproduction control is performed according to the attached information having already been detected. Hence, inconvenient operation, such as reproduction stoppage in the middle of reproduction, does not occur. Furthermore, in the case that the recording medium is inserted into the reproducing apparatus again, valid information items of the attached information stored the last time are used. Hence, it is not necessary to newly detect the attached information, and the processing is completed more quickly.

The digital watermark detection section 106 may also be configured so that the attached information of the content is detected and stored in the storage section 610 of the memory card 210 regardless of the operation of the user, provided that the attached information of the content is in a detectable state.

In the above-mentioned embodiments, the reproduction of an SD memory card is described as an example of the reproduction of a recording medium. However, the present invention is applicable to not only the SD memory card but also DVD audio disks and other reproduction-only media.

Furthermore, in the case that information is copied (recorded) from a recording medium (for example, CD) to another recording medium (for example, HDD or MD), recording control is carried out occasionally using digital watermarking. Even in this case, the present invention is also applied. In the case that recording start operation has been carried out by the user, attached information is first detected, and the reproduction control of the present invention is carried out according to the result of the detection. As a result, recording control can be carried out.

INDUSTRIAL APPLICABILITY

The present invention is applicable to a reproducing apparatus that carries out the reproduction control of a content according to attached information embedded in the content.

The invention claimed is:

1. A reproducing apparatus comprising:
a detection section that detects attached information embedded in a content recorded on a recording medium, and
a control section that controls the reproduction of the content corresponding to the attached information detected using said detection section according to the attached information, wherein
when a reproduction start command has been input, attached information detection operation for detecting the attached information is performed before reproducing operation without outputting sound to the outside of the reproducing apparatus, and reproduction control is carried out according to the result of the detection.

2. The reproducing apparatus according to claim 1, wherein the detection result regarding the attached information detected using said detection section is recordable on said recording medium.

3. The reproducing apparatus according to claim 1, wherein said detection section is formed of a digital watermark detection section.

4. The reproducing apparatus according to claim 1, wherein the attached information is information embedded as a digital watermark in the content.

5. The reproducing apparatus according to claim 1, wherein the detection of the attached information using said detection section is done more quickly than reproducing operation.

6. A reproducing apparatus comprising:
a detection section that detects attached information embedded in a content recorded on a recording medium before reproducing operation without outputting sound to the outside of the reproducing apparatus is carried out,
a storage section that stores the attached information detected using said detection section and the content so as to be related to each other using a method capable of preventing falsification or a method capable of detecting falsification, and
a control section that controls the reproduction of the content corresponding to the attached information stored in said storage section according to the attached information.

7. A reproducing apparatus comprising:
a detection section that detects attached information embedded in a content recorded on a recording medium before reproducing operation without outputting sound to the outside of the reproducing apparatus, when the attached information is in a detectable state,
a storage section that stores the detected attached information and the content so as to be related to each other using a method capable of preventing falsification or a method capable of detecting falsification, and
a control section that controls the reproduction of the content corresponding to the attached information stored in said storage section according to the attached information.

8. A reproducing method comprising:
a step of detecting attached information embedded in a content recorded on a recording medium before reproducing operation without outputting sound to the outside of the reproducing apparatus is carried out when a reproduction start command has been input, and
a step of controlling the reproduction of the content corresponding to the detected attached information according to the attached information.

9. The reproducing method according to claim 8, wherein the detection result regarding the attached information of the content recorded on said recording medium is recorded on said recording medium.

10. The reproducing method according to claim 8, wherein the detection of the attached information is done more quickly than reproducing operation.

11. A reproducing method comprising:
a step of detecting attached information embedded in a content recorded on a recording medium before reproducing operation without outputting sound to the outside of the reproducing apparatus is carried out,
a step of storing the detected attached information and the content so as to be related to each other using a method capable of preventing falsification or a method capable of detecting falsification, and
a step of controlling the reproduction of the content corresponding to the stored attached information according to the attached information.

12. A reproducing method comprising:
a step of detecting attached information embedded in a content without outputting sound to the outside of the reproducing apparatus when the attached information is in a detectable state, even before a reproduction start command is input,
a step of storing the detected attached information, and
a step of controlling the reproduction of the content corresponding to the stored attached information according to the attached information.

* * * * *